United States Patent
Cai et al.

(10) Patent No.: US 10,110,933 B2
(45) Date of Patent: Oct. 23, 2018

(54) VIDEO FILE PROCESSING

(71) Applicant: International Business Machines Corporation, Armonk, NY (US)

(72) Inventors: Keke Cai, Beijing (CN); Dong Xu Duan, Beijing (CN); Changhua Sun, Beijing (CN); Li Zhang, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/841,838

(22) Filed: Sep. 1, 2015

(65) Prior Publication Data

US 2017/0064345 A1   Mar. 2, 2017

(51) Int. Cl.
| | |
|---|---|
| *H04N 7/10* | (2006.01) |
| *H04N 21/234* | (2011.01) |
| *H04N 21/81* | (2011.01) |
| *H04N 21/845* | (2011.01) |
| *H04N 21/8358* | (2011.01) |

(52) U.S. Cl.
CPC . *H04N 21/23418* (2013.01); *H04N 21/23424* (2013.01); *H04N 21/812* (2013.01); *H04N 21/8358* (2013.01); *H04N 21/8456* (2013.01)

(58) Field of Classification Search
CPC .................. H04N 21/23418; H04N 21/23424
See application file for complete search history.

(56) References Cited

U.S. PATENT DOCUMENTS

| | | | |
|---|---|---|---|
| 8,380,175 B2 | 2/2013 | Rao | |
| 8,607,295 B2 | 12/2013 | Bhatia et al. | |
| 8,750,602 B2 | 6/2014 | Li et al. | |
| 8,799,951 B1 | 8/2014 | Hamilton et al. | |
| 8,850,495 B2 | 9/2014 | Pan | |
| 2003/0028873 A1* | 2/2003 | Lemmons | H04N 7/17318 725/36 |
| 2013/0088337 A1* | 4/2013 | Blanchflower | G08B 3/00 340/384.1 |
| 2015/0113557 A1* | 4/2015 | Kim | H04N 21/8153 725/32 |
| 2015/0215668 A1* | 7/2015 | Chawla | H04N 21/4394 725/18 |
| 2015/0256905 A1* | 9/2015 | Lee | H04N 21/233 725/18 |
| 2016/0066013 A1* | 3/2016 | Li | H04N 21/2541 725/75 |

OTHER PUBLICATIONS

Chen et al., "Personalized Mobile Advertising: Its Key Attributes, Trends, and Social Impact," Technological Forecasting and Social Change, Mar. 2012, p. 543-557, vol. 79, Issue 3, Elsevier Inc., Abstract Only Provided, http://www.sciencedirect.com/science/article/pii/S0040162511001788, Accessed on Aug. 28, 2015.

* cited by examiner

*Primary Examiner* — Olugbenga O Idowu
(74) *Attorney, Agent, or Firm* — Erik K. Johnson; Reza Sarbakhsh (57) ABSTRACT

In an embodiment of the present invention, a video file is divided into video frames, and a target object is recognized from the video frames. Then the target object is matched in a data source, and an ultrasonic signal containing information related to the target object is generated.

11 Claims, 5 Drawing Sheets

VIDEO FILE PROCESSING

FIELD OF INVENTION

The present invention relates to information processing technology, and more specifically, to a computer-implemented method for video file processing and a system thereof.

BACKGROUND

Nowadays video-based object advising or advertisement is widely used and plays an important role in the field of advertisement. A video provider can provide a terminal device with advertising information about a certain product or service through video advertisement, when a user uses the terminal device to watch a video program. The terminal device can be any device used by an end user and equipped with a display screen, such as mobile phone, smart phone, personal computer, notebook, etc.

One conventional video advertisement technique is to advertise a product or service at the beginning of the video program. Generally, the advertised product or service is independent of contents of the video program.

Another conventional video advertisement technique is to present a two-dimensional Quick Response (QR) code on a display of the terminal device when playing the video program. Typically, the QR code is related to the content of the video program. When the QR code is scanned, the QR code is decoded and information stored in the QR code can be provided to the user.

Another conventional video advertisement technique is to utilize an ultrasonic signal to carry advertising information. The advertising information is predefined and encoded into the ultrasonic signal in advance. When playing the video program, the ultrasonic signal will be transmitted to the terminal device.

In the above video advertisement techniques, the advertised products or advertising information are predefined and encoded, which may result in bad performance in scalability. If some new product or service needs to be advertised, new advertisement or new QR code or new ultrasonic signal related to the new product or service would be regenerated.

SUMMARY

According to an embodiment of the present invention, there is provided a computer-implemented method. In the method, a video file is divided into video frames, and a target object is recognized from the video frames. Then the target object is matched in a data source, and an ultrasonic signal is generated containing information related to the target object.

According to another embodiment of the present invention, there is provided a system. The system comprises one or more processors, a memory coupled to at least one of the processor, and a set of computer program instructions stored in the memory and executed by at least one of the processors. The set of computer program instructions when executed perform actions of dividing a video file into video frames, recognizing a target object from the video frames, matching the target object in a data source, and generating an ultrasonic signal containing information related to the target object.

According to another embodiment of the present invention, there is provided a computer program product. The computer program product comprises a computer readable storage medium having program instructions embodied therewith. The program instructions are executable by a processor to cause the processor to divide a video file into video frames, recognize a target object from the video frames, match the target object in a data source, and generate an ultrasonic signal containing information related to the target objects.

BRIEF DESCRIPTION OF THE SEVERAL VIEWS OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure.

Figure 1:
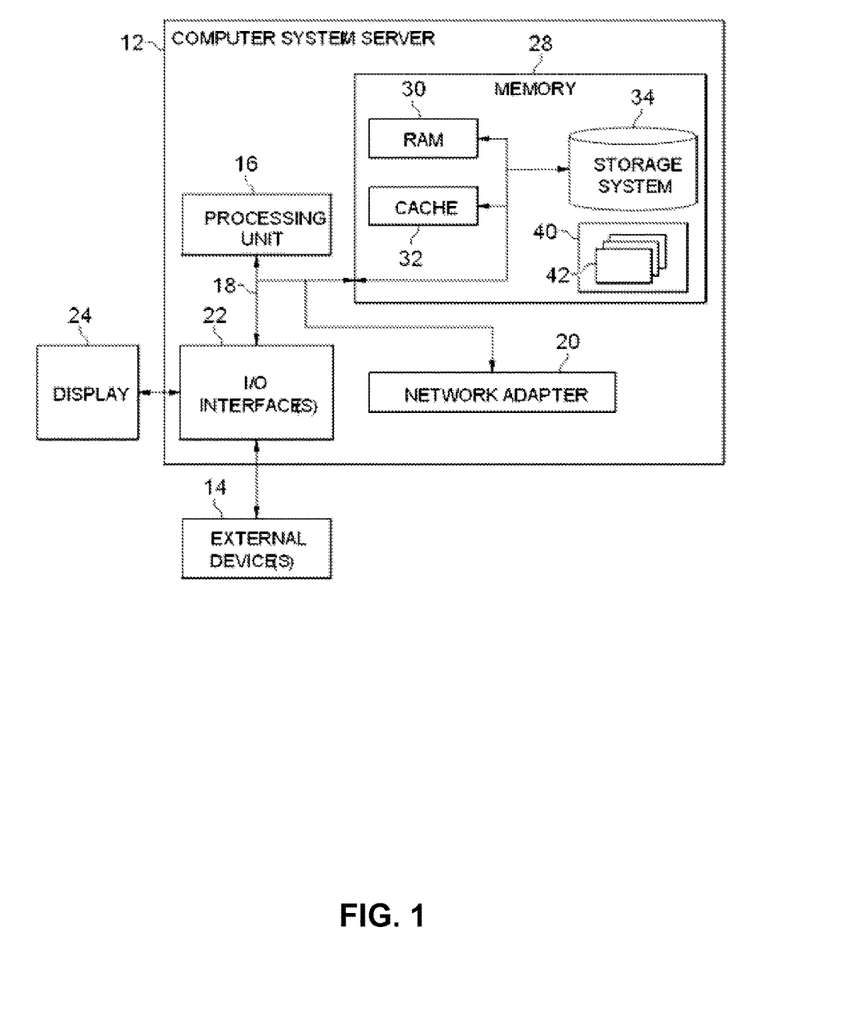
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
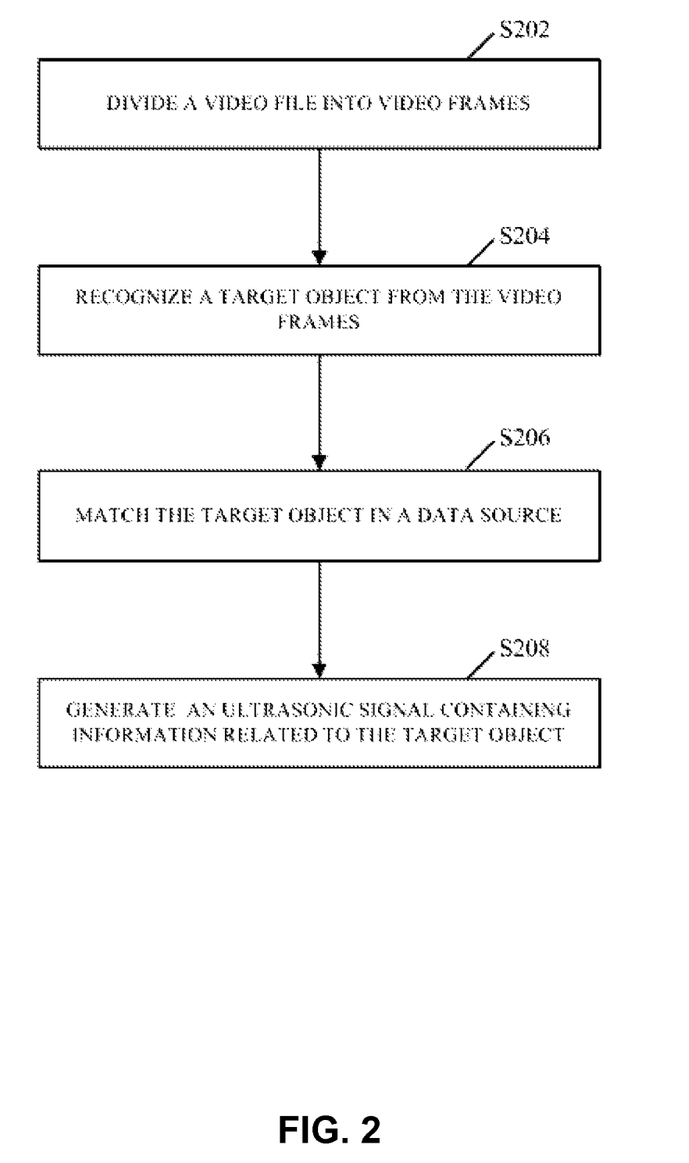
FIG. 2 is a schematic flowchart of the computer-implemented method for video file processing according to an embodiment of the present invention.

With reference now to FIG. 2, it shows a schematic flowchart of the method for video file processing according to an embodiment of the present invention. This embodiment will be described in detail below in conjunction with the figures.

The main idea of one embodiment of the present invention is to recognize a target object from a video file and provide information about the target object over an ultrasonic signal. In another embodiment, the ultrasonic signal can be further transmitted to a terminal device of a user in real time when the target object is displayed on the terminal device.

The method is initiated after obtaining the video file from a video source. The video source may be any kind of device which either generates or transmits video files. The video file can be transmitted over wireless links or wire line links. Moreover, the video file can be in any kind of format, for instance, avi format or Mpeg4 format.

As shown in FIG. 2, at step S202, dividing the video file into a plurality of video frames is performed. As well known, the video file can be divided by a predefined time interval. The video frames can be stored in a memory for future processing.

The division of the video file is well known for those skilled in the art and any existing method for division of a video file can be used in the embodiment.

At step S204, recognizing at least one target object from the video frames is performed. In the embodiment, an object can refer to any tangible visible object, e.g. a consumer product, a building, etc., or a human being. A target object is the object that appears in the video file and will be provided to a user who is watching the video file using the terminal device. For instance, if the video file is a TV program, the products appearing in the TV program with a high occurrence frequency could be the target objects.

Figure 3:
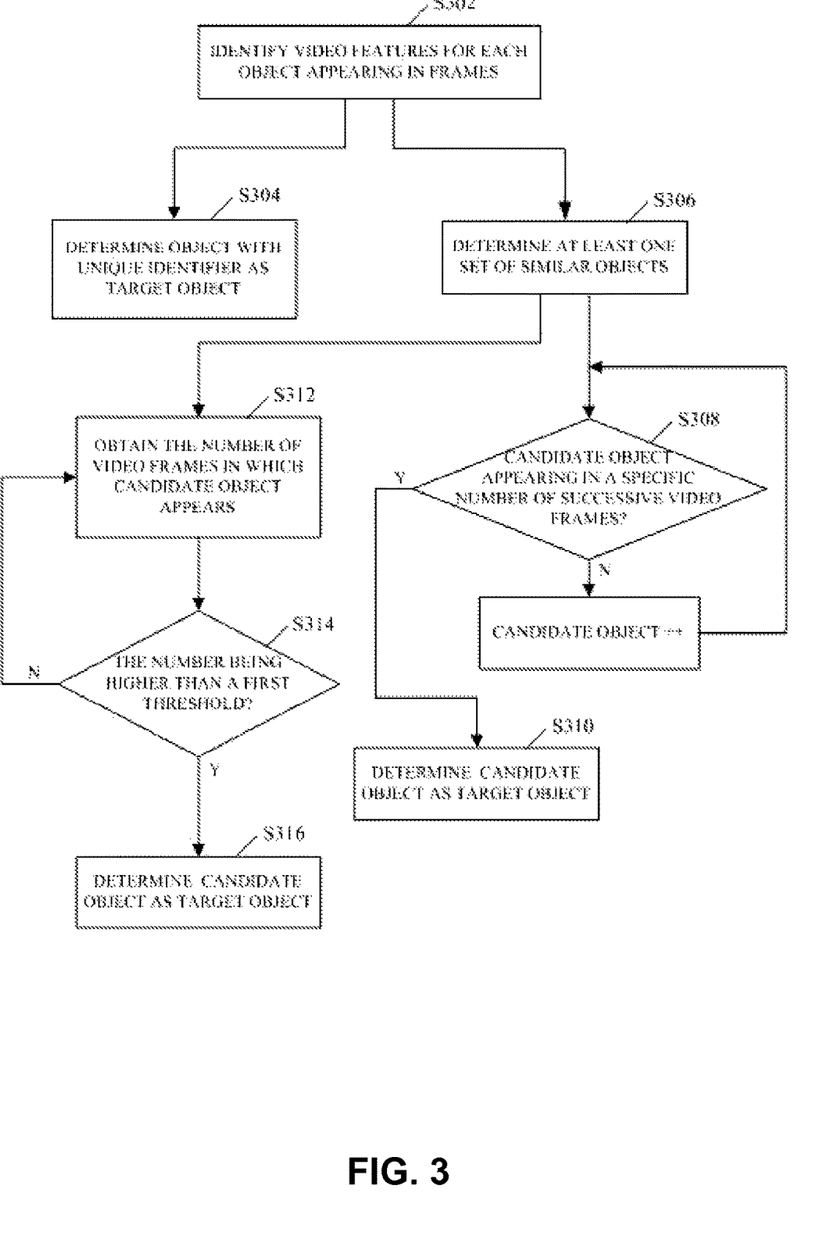
FIG. 3 is a schematic flowchart illustrating the recognization of the target object in the method shown in FIG. 2.

FIG. 3 shows a schematic flowchart illustrating the process of recognition of the target object (step S204).

As shown in FIG. 3, at step S302, for each of the video frames, video features for each object appearing in the video frame are identified. Thus the video features associated with each object in all the video frames can be identified and collected.

The video feature for an object in a video frame can indicate an attribute of the object. The video feature may comprise at least one of: a close-up shot of the object, relative position of lens to the object, completeness of the object in the video frame, part of the object in the video frame, and the physical characteristics of the video frame such as pixel resolution of the video frame.

From the video features for the object, main and important attributes of the object can be identified, such as logo, trademark, color, shape, various views, type, structure, etc. These attributes can assist in determining whether the objects are similar.

At step S304, in response to the identified video feature indicating a unique identifier of the object, such as a logo or a trademark, the object with the unique identifier is determined as the target object. The unique identifier can identify the object.

Figure 4:
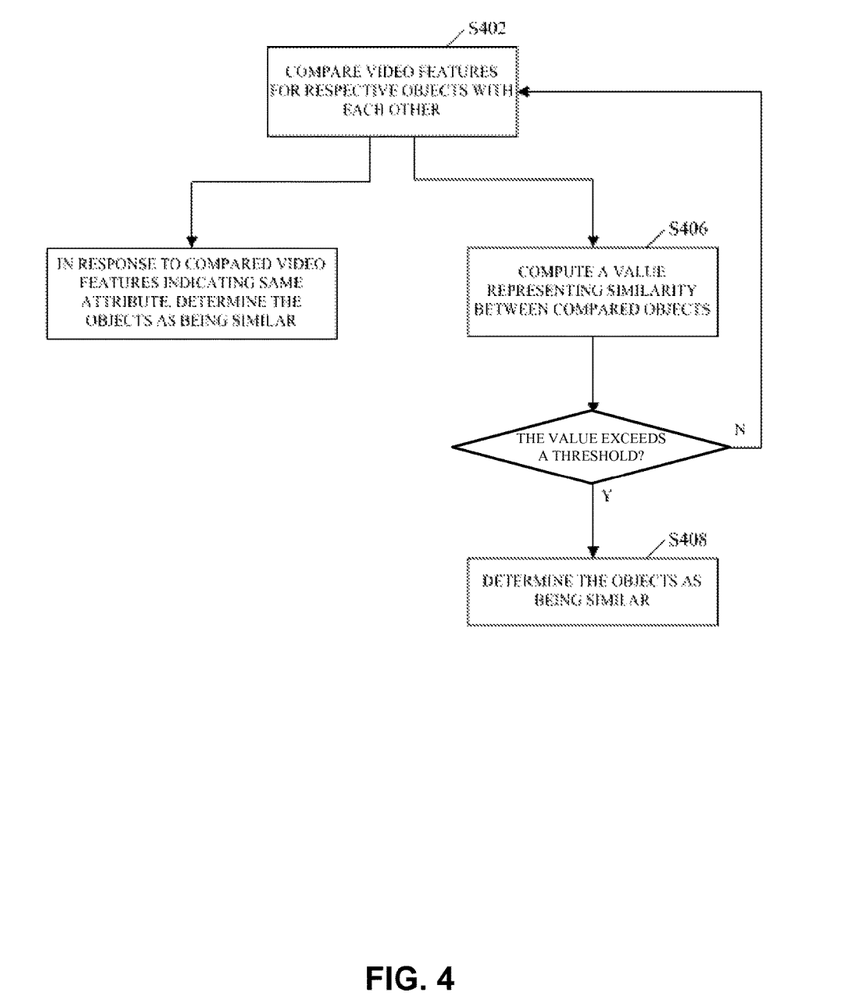
FIG. 4 is a schematic flowchart illustrating the determination of the candidate object in the method shown in FIG. 3.

Alternatively or additionally, after step S302 and at step S306, at least one set of similar objects is determined based on the video features obtained in step S302. FIG. 4 shows the process of the determination of the similar objects (step S306).

As shown in FIG. 4, at step S402, the video features for the respective objects are compared with each other to determine a similarity between the objects. Specifically, the video features for each object in one video frame are compared with the video features for each object in the remaining video frames. The comparison is performed on the objects one by one to determine the similarity between the two objects in the different video frames.

At step S404, in response to the compared video features for the objects from the different video frames indicating the same attribute, the corresponding objects are determined as being similar.

Alternatively or additionally, after step S402 and at step S406, a value representing the similarity between the compared objects can be computed based on the similarity between the attributes of the compared objects indicated by the video features.

If the value exceeds a predefined threshold value, at step S408, the compared objects are determined as being similar. Otherwise the compared objects are determined as being dissimilar.

The objects determined as being similar constitute a set of similar objects, and the set of similar objects can be identified as a candidate object for determining the target object.

Returning back to FIG. 3, after determining the at least one set of similar objects, at step S308, it is checked whether the candidate object appears in a specific number of the successive video frames. In response to the candidate object appearing in the specific number of the successive video frames, at step S310, the candidate object is determined as the target object. That is, if the similar objects identified as the candidate object appear in the specific number of the successive video frames, the candidate object is determined as the target object. The number of the successive video frames may be predetermined as required, for example, five successive video frames. The occurrence of the object in the successive video frames may indicate to some extent that this object is worthy of being advised, and can be used to determine the target object. If the candidate object does not appear in the specific number of the successive video frames, the candidate object is not determined as the target object. If the candidate object is not the last one, the process proceeds to step S308.

Alternatively or additionally, at step S312, the number of the video frames in which the candidate object appears can be obtained, which indicates an occurrence frequency of the candidate object. The higher the occurrence frequency is, the more likely the candidate object is to be the target object. At step S314, it is determined whether the obtained number of video frames is higher than a first threshold. If so, at step S316, the candidate object is determined as the target object. If not, the candidate object is not determined as the target object.

The steps S308 to S310 and/or S312 to S316 are repeatedly performed for all the candidate objects. If no target object is determined through the steps S308 to S310 and/or S312 to S316, the candidate object which appears in the large number of frames or successive frames can be determined as the target object.

In addition, if the obtained number of video frames in which the candidate object appears is higher than a second threshold which is higher than the first threshold, the candidate object may be an interference object and such the candidate object will not be determined as the target object and will be ignored.

Returning back to FIG. 2, after recognizing the target object, at step S206, matching the target object in a data source is performed. In the embodiment, the data source can store information related to a large amount of objects, including picture information and text information. The data source can be any kind of database, or a cloud environment, or Internet.

In this step, the video features for the target object identified are used to find the matching object with the target object in the data source by image matching, i.e. matching the video features with the stored picture information. If at least a part of the video features matches with a piece of the picture information, it indicates that there is the target object in the data source. If all the video features for the target object do not match any picture information, it indicates that there is no target object in the data source.

The video features for the target object from multiple video frames (e.g. the successive video frames or all the related video frames) can provide a more complete description of the target object, so as to find the matching object correctly in the data source.

According to one embodiment, the picture information can be a complete picture of the object, a partial picture of the object, or a picture related to certain features of the object. Moreover, the text information can describe all the related information of the object in words, such as the name of the object, the manufacturer of the object, the characteristics of the object, the coupons about the object, Unified Resource Locator for the object, and the like. The information stored in the data source can be added, modified, deleted dynamically.

In addition, the text information can be stored in two forms, one is the detail information of the object, and the other is the abstract information of the object.

Finally at step S208, generating an ultrasonic signal containing information related to the target object is performed. In the embodiment, after finding the target object in the data source, the information related to the target object can be retrieved from the data source. Then the retrieved information is encoded into the ultrasonic signal. It is well known for those skilled in the art to encode the information into the ultrasonic signal.

Ultrasonic is an acoustic wave of which a frequency is higher than 20,000 Hz. The ultrasonic has following features: good directivity and high power. Thus an ultrasonic signal can be transmitted directionally and remotely. Moreover the ultrasonic signal would be stable, such that the information contained in the ultrasonic signal would not be damaged.

Figure 5:
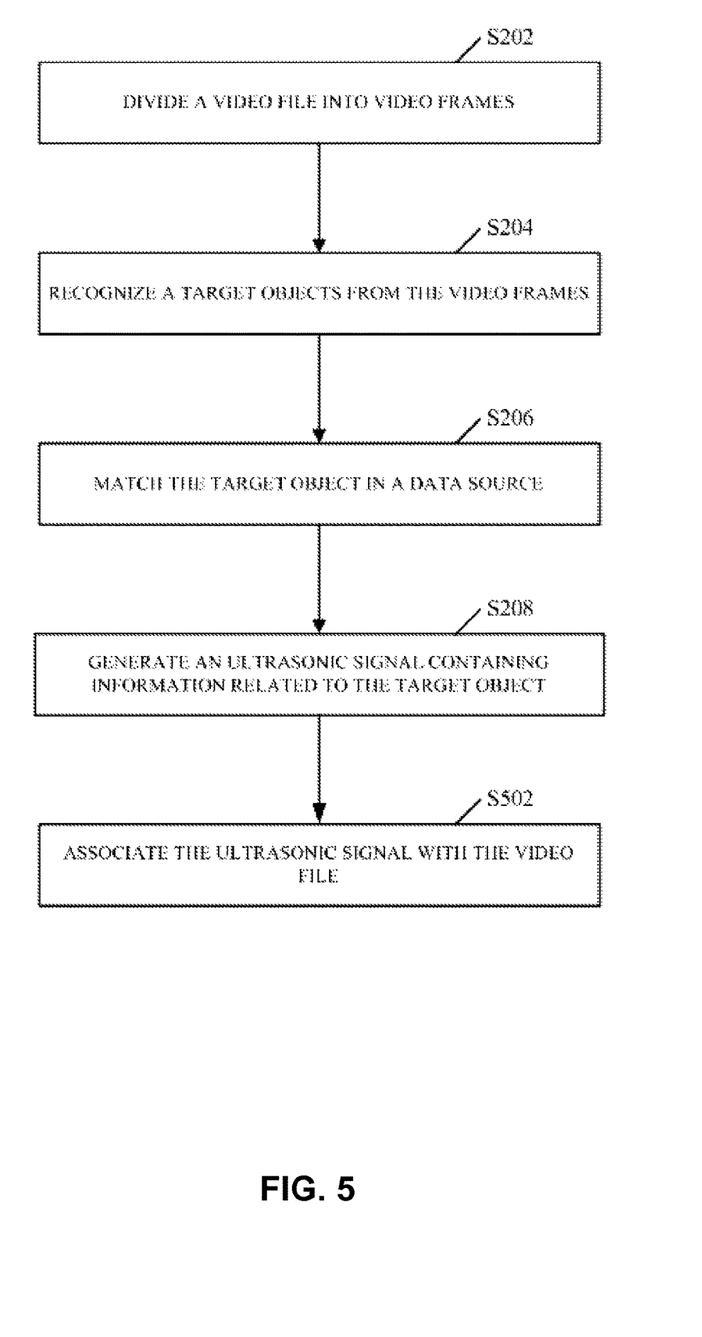
FIG. 5 is a schematic flowchart of the computer-implemented method for video file processing according to another embodiment of the present invention.

FIG. 5 shows a flow chart of the method for video file processing according to another embodiment of the present invention. In this embodiment, association between the ultrasonic signal for the target object and the video file is established besides the steps of the embodiment as shown in FIG. 2.

As shown in FIG. 5, after generating the ultrasonic signal (step S208), at step S502, associating the ultrasonic signal for the target object with the video file is performed. In an embodiment the ultrasonic signal for the target object is associated with a specific video frame of the video file in which the target object appears. In this case, the ultrasonic signal can be combined with the video file to form a single file. The specific video frame can be the first video frame in which the target object appears, or the video frame having the close-up shot of the target object, or the video frame in which the target object appears completely, for example.

In another embodiment, the ultrasonic signal can be associated with the video file such that the ultrasonic signal can be transmitted when displaying the video frames in which the target object appears.

Further, the ultrasonic signal for the target object can be transmitted to the terminal device when playing the video file on the terminal device. In an embodiment, the ultrasonic signal for the target object is transmitted while displaying the specific video frame in which the target object appears. In another embodiment, the ultrasonic signal for the target object is transmitted to the terminal device when displaying any video frame in which the target object appears. Upon receipt of the ultrasonic signal, the terminal device can decode the ultrasonic signal, and display the decoded information.

Further the ultrasonic signal can be transmitted once or multiple times. In addition, the ultrasonic signal for the target object can be transmitted at a time interval from the first one of the successive video frames in which the target object appears to the last one of the successive video frames.

The ultrasonic signal can be transmitted through a speaker of the terminal device which is playing the video file and received through a microphone of the terminal device. As the frequency of the ultrasonic is higher than 20,000 Hz, the ultrasonic signal cannot be heard by a human being. Thus the transmission of the ultrasonic signal would not affect the user experience of watching the video file.

In the embodiment, the terminal device can be, for example, television set, mobile device such as mobile phone or smart phone, personal computer such as notebook, personal digital assistant, laptop computer, or tablet, and the like.

The methods according to the embodiments of the present invention can be implemented at a video provider side. With the methods of the embodiments of the present invention, the target object to be advertised can be recognized from the video file, and the information related to the target object can be provided via the ultrasonic signal when playing the video file, so the advertising information is closely related to the video file.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    dividing a video file into video frames;
    identifying video features associated with a plurality of objects included in the divided video frames, wherein the video features identify a logo, a trademark, a structure, a shape, a view, and a color associated with the plurality of objects;
    based on the identified video features, identifying a target object associated with the plurality of objects in the video frames, wherein identifying the target object comprises determining at least one set of similar objects based on video features, the set of similar objects being identified as a candidate object, and in response to the candidate object appearing in a predetermined plurality of successive video frames, identifying the candidate object as the target object;
    comparing the target object to information associated with a set objects stored on a data source to identify the information to associate with the target object;
    generating and transmitting to at least one terminal device an ultrasonic signal containing the identified information related to the target object;
    associating the ultrasonic signal containing the identified information with the video file, wherein associating the ultrasonic signal with the video file comprises associating the ultrasonic signal with a plurality of video frames of the video file in which the target object appears; and
    transmitting the ultrasonic signal for the target object at a time interval from a first one of the predetermined plurality of successive video frames in which the target object appears to a last one of the predetermined plurality of successive video frames.

2. The method as set forth in claim 1 wherein the ultrasonic signal is associated with the video file such that the ultrasonic signal is transmitted when displaying the video frames in which the target object appears.

3. The method as set forth in claim 1 wherein determining at least one set of similar objects comprises:
    comparing the video features for the respective objects with each other to determine a similarity between the objects; and
    determining the objects with the similarity exceeding a predefined threshold value as the set of similar objects.

4. The method as set forth in claim 1 wherein the video features comprise at least one of the followings: a close-up shot of an object, relative position of lens to an object, whether an object appears partially in a video frame, whether an object appears fully in a video frame, and physical characteristics of a video frame.

5. A system comprising:
    one or more processors;
    a memory coupled to at least one of the processors;
    a set of computer program instructions stored in the memory and executed by at least one of the processor in order to perform actions of:
    dividing a video file into video frames;
    identifying video features associated with a plurality of objects included in the divided video frames, wherein the video features identify a logo, a trademark, a structure, a shape, a view, and a color associated with the plurality of objects;
    based on the identified video features, identifying a target object associated with the plurality of objects in the video frames, wherein identifying the target object comprises determining at least one set of similar objects based on video features, the set of similar objects being identified as a candidate object, and in response to the candidate object appearing in a predetermined plurality of successive video frames, identifying the candidate object as the target object;
    comparing the target object to information associated with a set objects stored on a data source to identify the information to associate with the target object;
    generating and transmitting to at least one terminal device an ultrasonic signal containing the identified information related to the target object;
    associating the ultrasonic signal containing the identified information with the video file, wherein associating the ultrasonic signal with the video file comprises associating the ultrasonic signal with a plurality of video frames of the video file in which the target object appears; and
    transmitting the ultrasonic signal for the target object at a time interval from a first one of the predetermined plurality of successive video frames in which the target object appears to a last one of the predetermined plurality of successive video frames.

6. The system as set forth in claim 5 wherein the set of computer program instructions when executed performs the action of associating the ultrasonic signal with the video file such that the ultrasonic signal is transmitted when displaying the video frames in which the target object appears.

7. The system as set forth in claim 5 wherein the set of computer program instructions when executed performs the action of determining at least one set of similar objects by:
    comparing the video features for the respective objects with each other to determine a similarity between the objects; and
    determining the objects with the similarity exceeding a predefined threshold value as the set of similar objects.

8. The system as set forth in claim 5 wherein the video features comprise at least one of the followings: a close-up shot of an object, relative position of lens to an object, whether an object appears partially in a video frame, whether an object appears fully in a video frame, and physical characteristics of a video frame.

9. A computer program comprising a computer readable storage medium having program instructions embodied therewith, the program instructions executable by a processor to cause the processor to:

divide a video file into video frames;

identify video features associated with a plurality of objects included in the divided video frames, wherein the video features identify a logo, a trademark, a structure, a shape, a view, and a color associated with the plurality of objects;

based on the identified video features, identifying a target object associated with the plurality of objects in the video frames, wherein identifying the target object comprises determining at least one set of similar objects based on video features, the set of similar objects being identified as a candidate object, and in response to the candidate object appearing in a predetermined plurality of successive video frames, identifying the candidate object as the target object;

comparing the target object to information associated with a set objects stored on a data source to identify the information to associate with the target object;

generating and transmitting to at least one terminal device an ultrasonic signal containing the identified information related to the target object;

associating the ultrasonic signal containing the identified information with the video file, wherein associating the ultrasonic signal with the video file comprises associating the ultrasonic signal with a plurality of video frames of the video file in which the target object appears; and transmitting the ultrasonic signal for the target object at a time interval from a first one of the predetermined plurality of successive video frames in which the target object appears to a last one of the predetermined plurality of successive video frames.

10. The computer program as set forth in claim 9 wherein the program instructions executable by the processor cause the processor to associate the ultrasonic signal with the video file such that the ultrasonic signal is transmitted when displaying the video frames in which the target object appears.

11. The computer program as set forth in claim 9 wherein the program instructions executable by the processor cause the processor to determine at least one set of similar objects by:

compare the video features for the respective objects with each other to determine a similarity between the objects; and determine the objects with the similarity exceeding a predefined threshold value as the set of similar objects.

* * * * *